United States Patent
Waldman et al.

(10) Patent No.: US 8,838,586 B2
(45) Date of Patent: Sep. 16, 2014

(54) RELEVANCY RANKING FOR MAP-RELATED SEARCH

(75) Inventors: Jaron Waldman, Palo Alto, CA (US); Chad Richard, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 490 days.

(21) Appl. No.: 12/718,938

(22) Filed: Mar. 5, 2010

(65) Prior Publication Data

US 2011/0218992 A1 Sep. 8, 2011

(51) Int. Cl.
*G06F 17/30* (2006.01)
*G06Q 30/02* (2012.01)
*G01C 21/36* (2006.01)

(52) U.S. Cl.
CPC ............ *G01C 21/3679* (2013.01); *G06Q 30/02* (2013.01); *G01C 21/3617* (2013.01)
USPC .................................. 707/724; 707/E17.018

(58) Field of Classification Search
USPC .......................................... 707/724, E17.018
See application file for complete search history.

(56) References Cited

U.S. PATENT DOCUMENTS

| | | | |
|---|---|---|---|
| 6,473,609 B1 * | 10/2002 | Schwartz et al. | 455/406 |
| 7,630,986 B1 * | 12/2009 | Herz et al. | 1/1 |
| 2004/0250072 A1 * | 12/2004 | Ylonen | 713/170 |
| 2006/0123014 A1 * | 6/2006 | Ng | 707/100 |
| 2007/0143345 A1 | 6/2007 | Jones et al. | |
| 2008/0318597 A1 | 12/2008 | Berns et al. | |
| 2009/0089149 A1 | 4/2009 | Lerner et al. | |
| 2009/0138445 A1 * | 5/2009 | White et al. | 707/3 |
| 2009/0241040 A1 * | 9/2009 | Mattila et al. | 715/760 |
| 2009/0254528 A1 * | 10/2009 | Tsao et al. | 707/3 |
| 2010/0049583 A1 * | 2/2010 | Panje | 705/10 |
| 2010/0064373 A1 * | 3/2010 | Cai et al. | 726/26 |
| 2010/0153292 A1 | 6/2010 | Zheng et al. | |
| 2010/0273504 A1 * | 10/2010 | Bull et al. | 455/456.1 |
| 2012/0122481 A1 * | 5/2012 | Aceves et al. | 455/456.1 |

FOREIGN PATENT DOCUMENTS

EP    2040209 A1    3/2009

OTHER PUBLICATIONS

Michael Fitzgerald: "Predicting Where You'll Go and What You'll Like", Jun. 22, 2008 XP002656648, Retrieved from the Internet: URL:http://www.nytimes.com/2008/06/22/technology/22proto.html.
Max Kiesler: "Macrosense—Real-Time Location Data", Jun. 22, 2008, XP002656651, Retrieved from the Internet: URL:http://www.maxkiesler.com/2008/06/22/macrosense-real-time-location-data/.
K.C. Jones: "Citysense Uses Mobile Data to Pinpoint Night Life Hot Spots", Jun. 9, 2008, XP002656652, Retrieved from the Internet: URL:http://www.informationweek.com/news/internet/ebusiness/208402912.
Brady Forrest: "Citysense: Lets You Know What Everybody's Doing", Jun. 9, 2008, XP002656653, Retrieved from the Internet: URL:http://radar.oreilly.com/2008/06/citysense-reality-mining-iphone.html.
International Search Report and Written Opinion mailed Aug. 22, 2011 for PCT/US2011/025625 (Pub No. WO 2011/109180), titled "Relevancy Ranking for Map-Related Search," to Apple Inc.
J. Froehlich, M.Y. Chen, I.E. Smith, and F. Potter, "Voting With Your Feet: An Investigative Study of the Relationship Between Place Visit Behavior and Preference," Lecture Notes in Computer Science, UbiComp 2006: Ubiquitous Computing (2006), Springer Berlin, Heidelberg, Germany, vol. 4206/2006, pp. 333-350.

* cited by examiner

*Primary Examiner* — Anteneh Girma
(74) *Attorney, Agent, or Firm* — Kilpatrick Townsend & Stockton LLP (57) ABSTRACT

The following relates to ranking search results consisting of locations or recommending locations to visit based on recorded data representing visits by a plurality of users to the locations represented as search results or recommended locations to visit. The data representing users' visits can be recorded by receiving data anonymously reported by handheld communication devices carried by the plurality of users. A handheld communication device, which is carried by a user, can report to the system the user's present location optionally associated with a time stamp. The handheld communication device can report either a single location coordinate or a collection of coordinates gathered over time.

26 Claims, 7 Drawing Sheets

| 502 | 504 | 506 | 508 | 510 | 512 | 514 | 516 | 518 | 520 | 522 | 524 |
|---|---|---|---|---|---|---|---|---|---|---|---|
| Location | Number of Visitors/Day | Breakfast Visitors | Lunch Visitors | Dinner Visitors | Avg. Duration | < .25 miles Traveled | .25-1 miles Traveled | 1-5 miles Traveled | 5-25 miles Traveled | Office | Commute |
| Chain Deli | 350 | 0 | 350 | 0 | 5 | 275 | 75 | 0 | 0 | 340 | 0 |
| Special Bakery | 300 | 100 | 200 | 0 | 15 | 100 | 175 | 25 | 0 | 100 | 75 |
| Subs | 425 | 25 | 400 | 0 | 5 | 175 | 250 | 0 | 0 | 300 | 50 |
| Main St. Deli | 500 | 125 | 375 | 0 | 10 | 200 | 250 | 50 | 0 | 450 | 50 |

FIG. 5

| Location | Number of Visitors/Day | Breakfast Visitors | Lunch Visitors | Dinner Visitors | Avg. Duration | < .25 miles Traveled | .25-1 miles Traveled | 1-5 miles Traveled | 5-25 miles Traveled | Office | Commute |
|---|---|---|---|---|---|---|---|---|---|---|---|
| Chain Deli | .3 | 0 | .3 | 0 | fast | .3 | .1 | 0 | 0 | .3 | 0 |
| Special Bakery | .3 | .1 | .2 | 0 | medium | .1 | .2 | 0 | 0 | .1 | .1 |
| Subs | .4 | 0 | .4 | 0 | fast | .2 | .3 | 0 | 0 | .3 | .1 |
| Main St. Deli | .5 | .1 | .4 | 0 | medium | .2 | .3 | .1 | 0 | .5 | .1 |

RELEVANCY RANKING FOR MAP-RELATED SEARCH

FIELD

The following relates to ordering map-related search results. More particularly, it relates to ordering map-related search results based in part on data representing visits to the locations.

BACKGROUND

A variety of services exist which allow users to search for locations to visit. For example, some mapping programs allow users to search for locations near the origin of the search request, and some websites allow users to search for locations near a given address or zip code. In all instances, the user provides a search request and the service provides a list of search results most closely matching the request. Some services order the search results by proximity; some services order the search results by an average user ranking; some services order the search results according to positions in the search results sold as advertisements; and some services use a variety of mechanisms to rank the search results.

Each approach has certain limitations associated with it. Search results ordered by proximity do not account for quality of the search result relative to the query. Search results ordered by average-user-ranking are based upon opinions of relatively few people whom take the time to review the location. Search results that are ordered based on advertising dollars also do not take into account quality or desirability and sometimes broaden the criteria for relevance beyond a desirable measure.

SUMMARY

In view of the drawbacks discussed above regarding the prior art methods of arranging search results, the following relates to ranking search results consisting of locations, or recommending locations to visit, based on recorded data representing visits by a plurality of users to the locations represented as search results, or recommended locations to visit. By ranking search results consisting of locations or recommending places to visit based upon actual visits to the locations, the collective wisdom and experience of the population can be used to deliver higher quality search results.

The data representing users' visits can be recorded by receiving data anonymously reported by handheld communication devices carried by the plurality of users. A handheld communication device, which is carried by a user, can report to a system for collection such data for use with ranking or recommending locations to visit, the user's present location optionally associated with a time stamp. The handheld communication device can report either a single location coordinate or a collection of coordinates gathered over time. Importantly, no user information is sent from the handheld communication device and the system cannot associate the received data with the user.

Data can be anonymously recorded and tracked for individual devices by assigning the device a unique identifier that is separate from any user information. One way to do this is to alert the handheld communication device of its unique ID, and the handheld communication device can report data along with its unique ID. In this way, the server will only be tracking the movements of an anonymous user based on an ID.

Based on the received data describing a user's coordinates, the system can correlate the user's coordinates to a location described by map data and thus identify the location(s) that the user has visited. Data representing the correlation between a user's visit to a location and the map data representing the location can be referred to as visitor-location data. The system similarly generates and records visitor-location data for a plurality of users and aggregates the collective visitor-location data for the plurality of users and stores this data in a location-popularity index.

The location popularity index can be used to rank search results by making various assumptions based on the data. For example, it can be assumed that a person who visited a restaurant for over an hour ate at the restaurant. If many users did the same thing, it can be assumed that many users ate at the restaurant. Based on these and other assumptions, search results can be ranked according to the locations having the most visitors. Accordingly, in a search for restaurants, the location that had the most number of visitors can be ranked the highest.

The visitor-location data can also be used to recommend new locations to an individual user when it is used to identify multiple locations that were visited by multiple people. If one user visited three restaurants, each for a sufficient duration, it can be assumed that the user ate at each restaurant. If the user visited any of the restaurants more than once, it can be assumed that the user liked the restaurant. Similarly, if two different users visit the same restaurants, it can be assumed that both users have the same taste in restaurants. Using these assumptions, a new restaurant can be recommended to the individual user. Using the example of the three restaurants, if two users visit all three restaurants, the two users' taste can be assumed to be similar. If one of the users asks for a recommendation, the system could recommend a restaurant by selecting a restaurant that the other user, with similar taste, tried. A stronger recommendation can be made if the user that tried the recommended restaurant made return visits. The larger the population of users that are considered to have similar taste, the better the recommendation.

Locations such as restaurants can also be recommended based on similarity to other restaurants. Rather than looking to users with similar taste, the system can track that many users that tried a first restaurant also tried the same second restaurant. Regardless of the tastes of the individual users, the two restaurants can be assumed to be similar because the same people visited both restaurants. In this way, if one restaurant is selected, a second restaurant can be recommended because it is assumed to be similar. This data can be stored in a similarity index that keeps track of a user's data by anonymous user identifications.

DESCRIPTION

The technology described herein relates to a method of ranking of the results of searches for locations based on data describing visits to the locations by people carrying handheld communication devices. In some embodiments of the technology described herein, this is accomplished by recording Global Positioning System coordinates (GPS coordinates) reported by handheld communication devices as users carry the handheld communication devices with them from location to location. The reported GPS coordinates can be correlated to identifiable locations, each having a perimeter that can be defined, also with GPS coordinates. Using this correlated data, an assumption can be made that a user of a portable communication device visited the location because the portable communication device reported a GPS coordinate that is within the defined footprint of the location. For ease of reference, the data describing that a user visited a location shall hereinafter be termed "visitor-location data".

The visitor-location data can further be aggregated across all other recorded visitor-location data reported from handheld communication devices carried by other users. From the aggregated visitor-location data, additional assumptions can be made that can be useful in ordering search results. For example, if more users visit one location than another, an assumption can be made that the location having more visitors is more popular. A more popular location can be assumed to be a better search result based on the collective wisdom of the population in visiting that location, and therefore the location having more visitors can be ranked higher in a list of search results reporting both locations.

Figure 1:
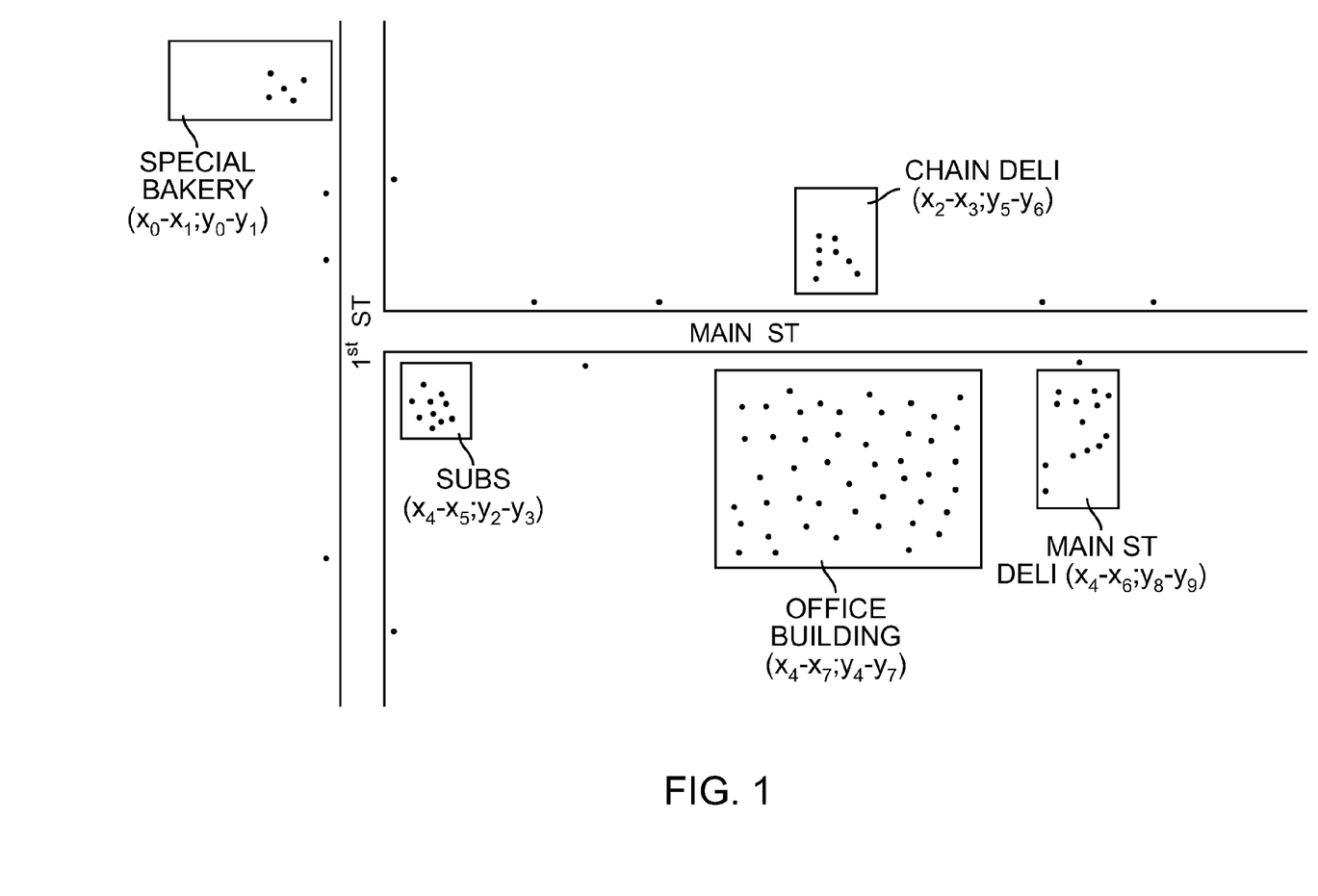
FIG. 1 is an example city intersection having an office building and four other locations.

FIG. 1 illustrates an exemplary city intersection having an office building and four locations that all can be returned in a search for a deli near the office building. Each building also has X and Y coordinates (representing latitude and longitudinal coordinates) that define the building's perimeter. Each dot represents a user with a handheld communication device. Every user can be mapped to a location based on his or her GPS coordinates, reported by their handheld communication device. Thus, as illustrated, some users are identified as outside and some users are identified as inside the buildings. Users inside a building, which can be an identified location, can be assumed to be patrons of the location and the visit can be recorded as visitor-location data. The identified locations illustrated in FIG. 1 are an office building, Chain Deli, Special Bakery, Subs, and Main St. Deli.

Figure 2:
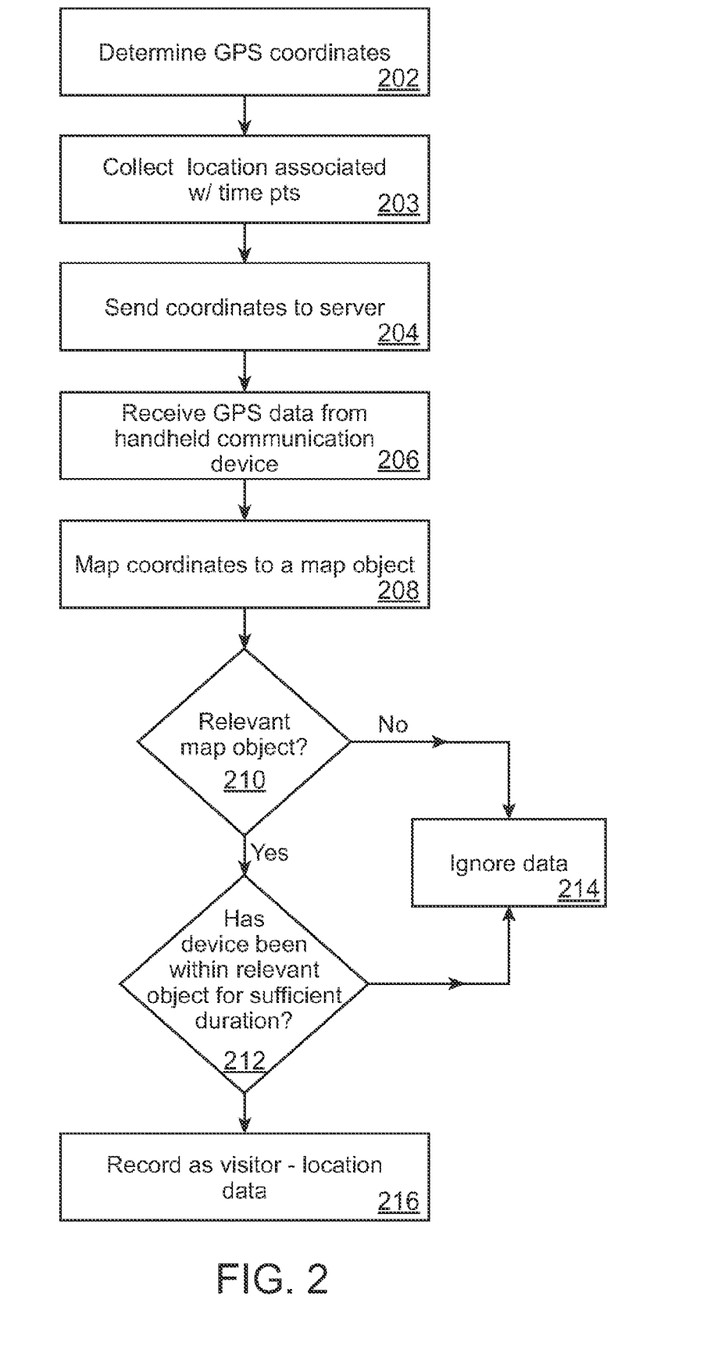
FIG. 2 is a flowchart illustrating a method embodiment for generating visitor-location data.

FIG. 2 illustrates a method for generating visitor-location data. A handheld communication device can determine its GPS coordinates (202). The handheld communication device can determine its GPS coordinates in real time or at the expiration of a determined interval such as every minute, every five minutes, etc. In some embodiments of the method, the handheld communication device can keep a record of its GPS coordinates associated with time points, representing the time of day that the GPS coordinate was recorded (203), and send the record of coordinates to a system server (204) as a collection of locations associated with time points. In some embodiments of the method, the handheld communication device can send the coordinates to the server (204) in nearly real time.

The server can receive the GPS coordinates (206), which optionally have been associated with time point data by the handheld communication device.

After receiving the data from the handheld communication device, the server can determine what GPS coordinates are meaningful enough to be considered visitor-location data. Data can be considered meaningful if some assumption can be made based on the data that can be useful in ranking results of a search for locations. For example, data that cannot be mapped to a specific identifiable location might not be useful because a location that cannot be identified cannot be returned as a search result. Additionally, if the data indicates that a user was only in a location for a very short duration, e.g., a fraction of a second, or just a few seconds, the data can be disregarded as an error. Sometimes when a user is moving quickly, such as when in a car, a GPS device can determine GPS coordinates to be within a building, but it is not possible that a user was within the building for such a short interval. In some instances, a visit of less than a minute can be disregarded because it might suggest the user ultimately did not patronize the location after a first impression. However, that data could be considered meaningful in the sense that it represents a negative impression and such data could be used to negatively impact a ranking of the search result.

One example of determining whether reported data is meaningful is illustrated by the remaining actions or decisions that are illustrated in FIG. 2 and that have not been addressed above. The system server can map each of the reported GPS coordinates to map objects such as streets and locations (208). This can be accomplished by identifying whether a user's GPS coordinates fall within the outer boundaries of a map object. Map objects can be described by map vector data which can capture the shape of map objects and locate their boundaries using GPS coordinates.

The system can determine if a user is within the boundaries of a map object by correlating a user's GPS location to be within the perimeter of a specific location. However, in some instances, the handheld computing device will not detect its GPS location if it is indoors. In such instances, the system can determine that a user is within the boundaries of a map object because the handheld device's GPS location was last detected next to, or entering the boundary of the map object. The system can also determine that a user is within the boundaries of a map object using assisted GPS or enhanced GPS wherein the handheld computing device's position is determined with the assistance of a server on a cellular network. Other methods of determining that a user is indoors when no GPS position can be determined can also be used, for example, the location of a handheld computing device can be determined by comparing the wireless networks detected by the device with a database of known networks.

One example of a map vector data file format is the SHAPEFILE, by ESRI of Redlands, Calif. SHAPEFILE is a popular geospatial vector data format for geographic information systems software. A SHAPEFILE is a digital vector storage format for storing geometric location and associated attribute information. The SHAPEFILE format can be a series of files linked together to describe a location and a shape of a map feature. SHAPEFILE is just one example of map vector data for use with the present technology, and any other data format or geographical information system that describes map features as geometrical shapes could also be used.

Next, the system server determines if the map object corresponding to the user's coordinate is a relevant map object (210). A map object can be relevant if it represents a location that will be searched upon by category, such as a business or a park; a road is not likely to be a location searched upon by a category. A user is likely to search for restaurants, or seafood restaurants, or hardware stores, but is unlikely to enter a query for roads as a categorical query. While a user might search for a specific road or intersection for the purpose of getting directions, her or she is unlikely to enter a search for the category roads and therefore such map objects might not be considered relevant. If the GPS coordinates correspond to a map object that is not relevant (210), the data will be ignored and no longer processed (214). If, however, the GPS coordinates correspond to a map object that is a relevant map object (210), the server will determine if the handheld communication device has been within the relevant map object for a sufficient duration to be considered meaningful data (212).

As addressed above, only data that indicates that a user has been within a map object for a sufficient period of time can be considered meaningful. A meaningful period of time can be a duration long enough to indicate that user visited a location, such as a minute, or a duration long enough to indicate that the user was either a patron or visitor. These periods of time can vary depending on the specific type of location. For example, a visit to a deli might be meaningful if it lasts just five minutes, while a visit to a formal restaurant might be meaningful it lasts forty-five minutes so as to distinguish from a user visiting a bar within a restaurant from a user that stayed for dinner. Likewise, a visit to a park might only be relevant if it lasts longer than the amount of time of time it takes to cross the park. Such duration could be used to distinguish whether that the user was just passing through the park or if the user visited the park.

Accordingly, whatever the period of time, the reported GPS coordinates are only meaningful if they indicate a user remained within the boundaries of a relevant map object for a sufficient duration of time to be considered meaningful. If the data is not considered meaningful, it can be ignored (214), but if it is considered meaningful if can be recorded as visitor-location data (216).

Figure 3:
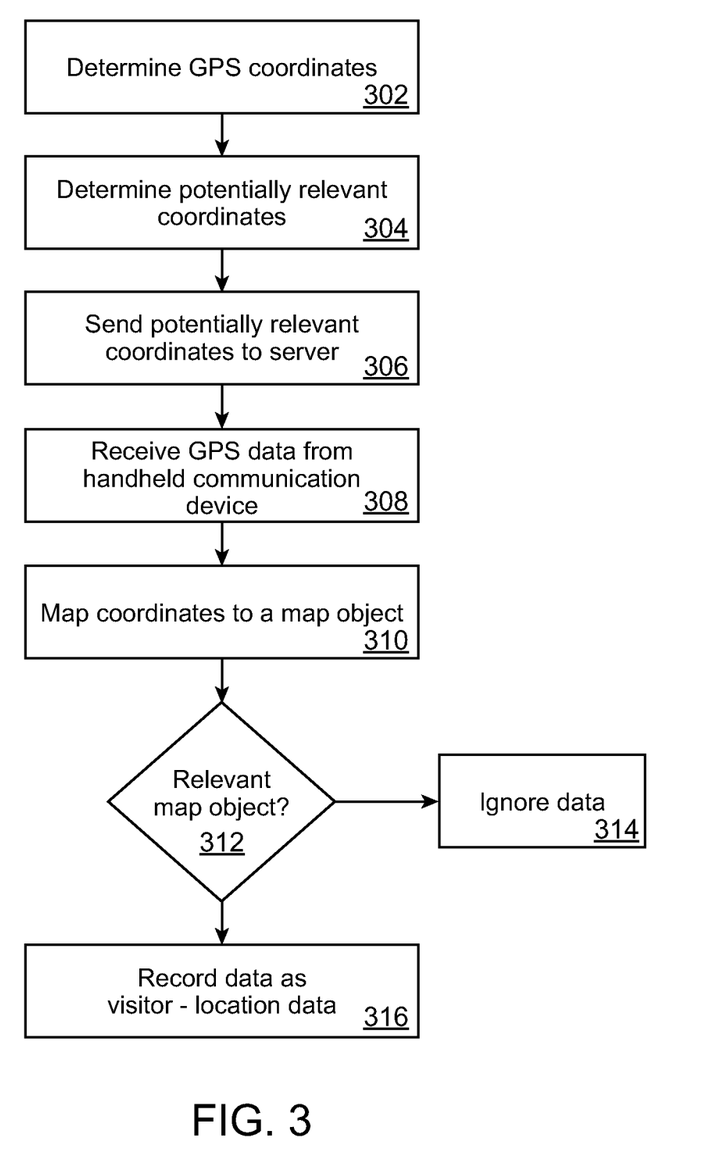
FIG. 3 is a flowchart illustrating a method embodiment for generating visitor-location data.

FIG. 3 illustrates another method for generating visitor-location data. A handheld communication device determines its present GPS coordinates (302) and determines if those coordinates are potentially relevant (304) by determining if a user is remaining or has remained in the same relative area for a sufficient duration to indicate the user visited that location. For example, the handheld communication device can make this determination by calculating the velocity at which the user carrying the phone is traveling. If the user is moving at about two miles per hour (the speed of a slow walk) or greater, the handheld communication device can determine that the user is not visiting a potential location because the user is assumed to be traveling. However, if the user's speed is close to zero miles per hour, the user can be presumed to have come to stop and thus visiting a potential location.

Another way a handheld communication device can determine whether the user is remaining or has remained in the same relative area is by determining a distance from a previously recorded GPS coordinate. If the user has moved less than ten meters, as an example, as determined from GPS coordinates taken at two points in time, the user can be assumed to be in the same location, and the GPS coordinates can be potentially relevant.

Another way a handheld communication device can determine GPS coordinates are potentially relevant is for the handheld communication device to download map vector data describing map objects of a surrounding area. Using this data, the handheld communication device could determine whether a user is within a potentially relevant map object.

Regardless of how the handheld communication device determines if the user's GPS coordinates are potentially relevant, the handheld communication device can make this determination and thereby eliminate unnecessary data transmissions by only sending potentially relevant coordinates to the server (306).

The server can receive the GPS coordinate data from the handheld communication device (308) and make a further determination as to its relevance. The server can map each of the reported GPS coordinates to a map object such as a street or a location (310). Next, the system server determines if the map object corresponding to the user's location is a relevant map object (312). Otherwise the data will be ignored and no longer processed (314). The data can be recorded as visitor-location data (316). It may not be necessary in this method embodiment for the server to determine if the handheld communication device has remained in one location long enough to be considered relevant since the handheld communication device has already made this determination.

While the embodiments illustrated in FIG. 2 and FIG. 3 have been addressed separately, it should be appreciated that one or more components from the different embodiments can be combined or otherwise used together in specific implementations. The embodiments in FIG. 2 and FIG. 3 are provided only to explain concepts encompassed by the present technology, and they should not be considered limiting outside of the specific recitations of the claims appended hereto.

Figure 4:
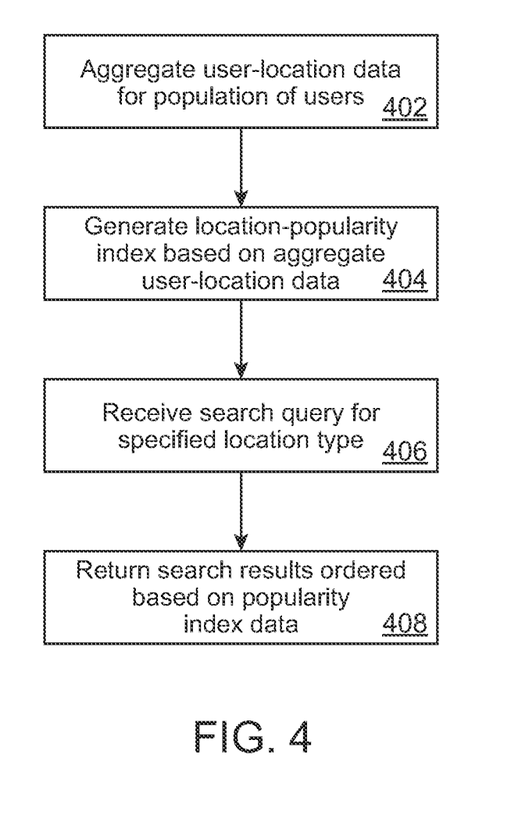
FIG. 4 illustrates a method of ordering search results based on aggregated visitor-location data.

While FIG. 2 and FIG. 3 illustrate exemplary methods of recording relevant visitor-location data, FIG. 4 illustrates a method of aggregating the visitor-location data recorded from a plurality of users carrying handheld communication devices and ordering search results based on the aggregated data. The aggregated data is more useful than the individual data because it reflects the preferences of the entire population of users, which is more likely to be trustworthy than data derived from one or a few users.

All of the visitor-location data for the entire population of users having handheld communication devices that report GPS coordinates to the system is aggregated (402). From the aggregated visitor-location data, a location-popularity index is created (404). The location-popularity index is comprised of data that can be used to weight search results for ranking. The location-popularity index can take any form or structure, but it will comprise either aggregated visitor-location data or data derived from the aggregated visitor-location data.

Figure 5:
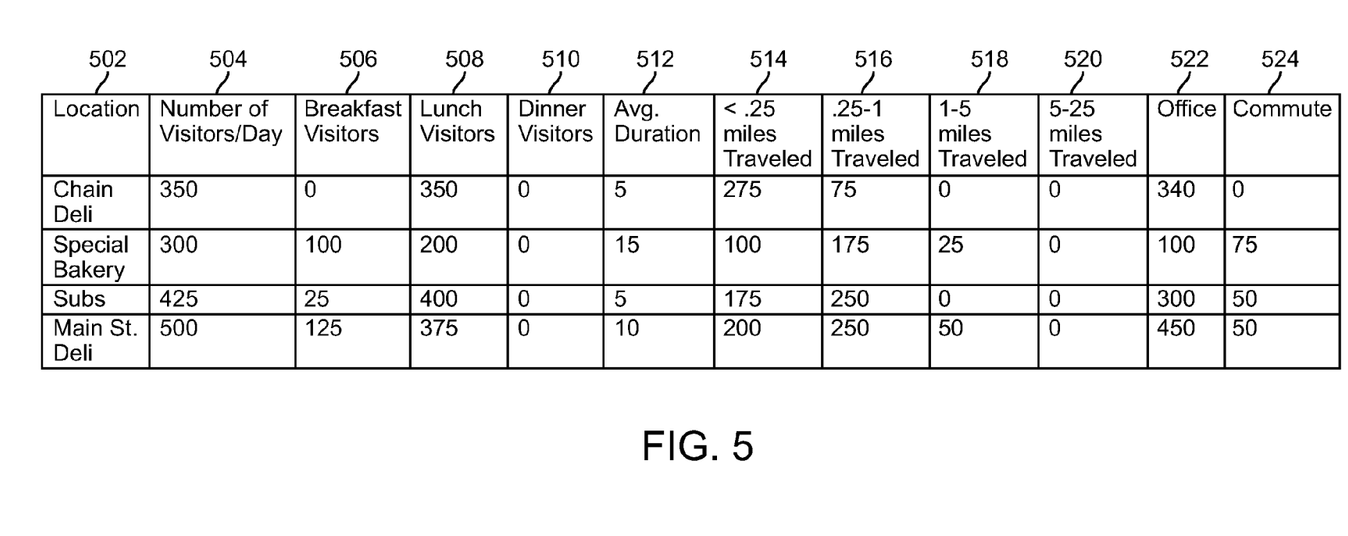
FIG. 5 illustrates an exemplary location-popularity index.

FIG. 5 illustrates an exemplary location-popularity index showing the number of users that visited a given location (502) broken down into a variety of categories that can be useful ranking search results such as total number of visitors per day (504); visitors during breakfast hours (506); visitors during lunch hours (508); visitors during dinner hours (510); and average period of time of visit (512). Data reflecting distances that various users traveled from their last recorded location to their present location are broken down into, for example, users traveling less than a quarter mile (514); users traveling a quarter of a mile to one mile (516); users traveling between one and five miles (518); and users traveling between five and twenty miles (520). The number of visitors that were at their office as the last identified location (522) or commuting before visiting their next location (524) is also recorded in the location-popularity index. Methods of determining which users fit these categories and the benefits of breaking the data down into these categories in ranking search results will be explained below.

As shown in FIG. 4, the server can receive a search query for a location (406). For example, a user can search for "delis" near his or her present location. Search results can be gathered and they are ranked using the data in the location-popularity index (408).

In the example of a search for delis near the office building illustrated in FIG. 1, a search can return four possible results, Chain Deli, Special Bakery, Subs, and Main St. Deli. The results can then be ordered based on the data in the location-popularity index. TABLE 1, below, illustrates how the search results order can be affected by using the data in the location-popularity index.

TABLE 1

| DISTANCE | Visitors/Day | Lunch Visitors/Day | Breakfast Visitors/Day |
|---|---|---|---|
| Main St Deli | Main St. Deli | Subs | Main St. Deli |
| Chain Deli | Subs | Main St. Deli | Special Bakery |
| Subs | Chain Deli | Chain Deli | Subs |
| Special Bakery | Special Bakery | Special Bakery | |

Table 1 illustrates how the search results order might change if a relevant factor in the location-popularity index were used to order the search results. In a scenario where distance is the most relevant factor, the order of the results would be Main St. Deli, Chain Deli, Subs, and then Special Bakery. However, if general popularity of a location were considered, the order of the results would change to Main St. Deli, Subs, Chain Deli, and then Special Bakery. If the search is conducted during a time of day that corresponds with breakfast or lunch hours, a better search result order can be achieved by considering only visitors during that same time period. For example, results during breakfast hours might be ordered as Main St. Deli, Special Bakery, and Subs. (Chain Deli would not be returned as a result in the search because no visits to Chain Deli in the morning were recorded. Perhaps, this is an indication that Chain Deli does not serve breakfast or coffee.

Figure 6:
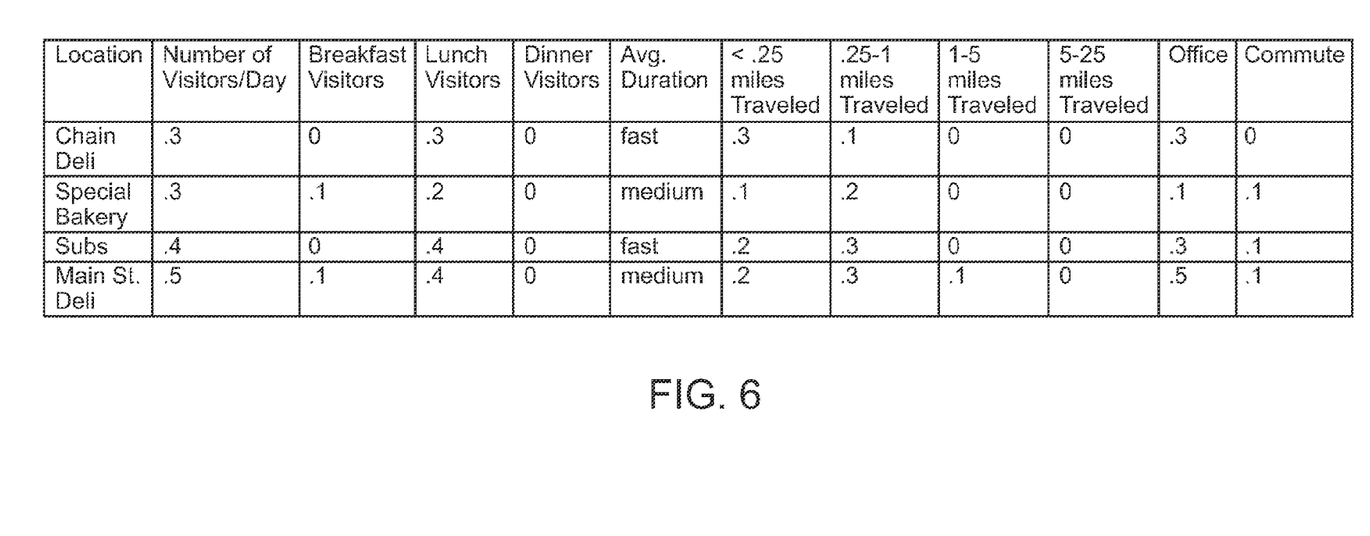
FIG. 6 illustrates another format for a location-popularity index.

A combination of factors can also be considered to provide better search result rankings. For example, FIG. 6 illustrates another format for a location-popularity index where the index includes scores to be used in weighting search results, which are derived from the same data represented in FIG. 5. Table 2 illustrates how the order of search results might look using multiple weighted factors. For purposes of created Table 2, Chain Deli and Main St. Deli are within a quarter mile of the office building and that Subs and Special Bakery are between a quarter mile and a half mile from the office building.

In Table 2, the ranking scores are generated from a formula that can weight each location's score for each category using a weighting factor provided by the system and sum those results. In Table 2, the formula used for a search by a person at the office building searching for a place for lunch is:

Lunch search results ranking value=Lunch Visitors/
Day Score (0.4)+Visitors/Day Score (0.1)+Distance Score (0.25)+Office (0.25)

And the formula used for a search by a person that is searching for a place for breakfast while on their commute is:

Breakfast search results ranking value=Breakfast Visitors/Day Score (0.4)+Visitors/Day Score (0.1)+
Distance Score (0.25)+Commute (0.25)

TABLE 2

| DISTANCE | Visitors/Day + Lunch Visitors/Day + Distance + Office | Visitors/Day + Breakfast Visitors/Day + Distance + Commute |
|---|---|---|
| Main St Deli | Main St. Deli - .385 = .4(.4) + .5(.1) + .2(.25) + .5(.25) | Main St. Deli - .19 = .1(.4) + .5(.1) + .3(.25) + .1(.25) |
| Chain Deli | Subs - .35 = .4(.4) + .4(.1) + .3(.25) + .3(.25) | Special Bakery - .145 = .1(.4) + .3(.1) + .2(.25) + .1(.25) |
| Subs | Chain Deli - .3 = .3(.4) + .3(.1) + .3(.25) + .3(.25) | Subs - .14 = 0(.4) + .4(.1) + .3(.25) + .1(.25) |
| Special Bakery | Special Bakery - .185 = .2(.4) + .3(.1) + .2(.25) + .1(.25) | Chain Deli - .055 = 0(.4) + .3(.1) + .1(.25) + 0(0.25) |

Using a weighted type formula, as illustrated in Table 2, search results can be better fitted to certain users because multiple factors can be taken into account and the weighting factors can be adjusted. It should be appreciated that different formulas can be used and optimized to output the best possible results using the data within the popularity-location index.

In addition to cumulative numbers of visitors to a location, time-of-day information can also be used to derive additional insight. For example, time-of-day information can be used to determine what search results are most relevant to a particular user. If the user is searching for a type of location that takes on different characteristics at different times of day, separate data can be kept regarding visits based on time of day. One example of such characteristics was illustrated above with respect to the delis wherein breakfast, lunch, and dinner times can affect the desirability of a location and consequently the ranking of the location. Some locations will not serve breakfast, some will only serve coffee and pastries, some might be bagel shops and thus less relevant during dinner hours. By tracking numbers of visitors based on time of day, reasoned assumptions can be made that can be useful in ranking search results.

A user's previous coordinate can also be useful in ranking search results. In the examples above, data was recorded relevant to whether a user visited the locations coming from the office or while commuting into work. To determine that a user was in the office before visiting a location, a user's previous location can be mapped to an office building and recorded. A similar method could be used to determine that a user is at home by determining that a previous location is a residential address. The handheld computing device could also report that the device is at a user's home based on the recurring visits and corresponding to a general time of day that is correlated with a person being at home. It can be assumed that a user is commuting if it is learned that a user is mobile. A stronger assumption can be made by combining data describing the user as mobile with a time of day associated with common commuting times or with a known public transportation route.

Data can be anonymously recorded and tracked for individual devices by assigning the device a unique identifier that is separate from any user information. One way to do this is to alert the handheld communication device of its unique ID, and the handheld communication device can report data along with its unique ID. In this way, the server will only be tracking the movements of an anonymous user based on an ID.

The distance a user travels to a location can also be used in ranking search data. For example, the desirability of a lunch location might be strongly correlated to distance because a user might need to get back to work quickly, but a hardware store might be less correlated to distance because a user will be more likely to go to the location that has what that user is looking to purchase. Distance can be determined by once again learning a user's previous location.

How a user responded to or acts in light of search results can also be valuable in ranking future search results. Using the same locations illustrated in FIG. 1, if a user searches for a bakery, and Main St. Deli is the highest ranked search result because it has the most total visitors in FIG. 5 and FIG. 6, but we learn that more users either went directly to Special Bakery or quickly left Main St. Deli in favor of a longer visit to Special Bakery, future search results can rank Special Bakery higher in response to searches for bakeries based on user responses to the search results.

Duration-of-visit data can also be valuable in ranking future search results because, in some instances, longer visits can indicate that a location met the needs of a user. However, in some instances such as when searching for fast-food restaurants, shorter visits might be more desirable.

In embodiments of the technology wherein the system can report on real-time data, the order of the search results can also be influenced based on crowd information. For example, a search on a Friday night for a nightclub might be influenced by is the presence of a crowd because even a usually great location might not be desirable if no one else is visiting that location.

Crowd data can also be used to order the results in an inverse way, e.g., rank search results associated with locations that are not crowded can be ranked higher. For example, the system can learn that the user is in a hurry and accordingly rank search results that will service the user the fastest as a better search result. The system can learn that the user is in a hurry by receiving an input from the user, or the system can infer that the user is in a hurry based on the nature of the search request, e.g., a search for fast-food restaurants could indicate that a user wants food quickly.

Day-of-the-week data can also be valuable in ranking search results. In looking for a good pub, some might be more desirable on different nights of the week. A pub might be empty, and thus undesirable, on Saturday, but more crowded on Thursday and thus more desirable.

As will be appreciated, a many different assumptions can be made based on the visitor-location data, and these assumptions are valuable in ranking search results, and the examples provided above should not be considered limiting.

In addition to ranking search results, the visitor-location data can also be used to recommend locations to a user. Recommendations can be based on similar locations or similar users. In the first instance, a user could select a seed location (perhaps a restaurant or store or venue that the user has previously experienced and liked) and request similar locations. A similar location can be returned based on a similar visitor profile. A visitor profile being numbers of visitors with similar assumptions made about those visitors as well as conventional data used in returning search results.

Alternatively, a location could be chosen as similar if multiple visitors have visited the same seed location and those visitors also visited another location. Because the visitors that are assumed to have liked the seed location (based on length of stay, return visits, or other factors) also frequented a second location and were assumed to have liked it, a correlation can be assumed between the first and second location, and thus, the second location can be recommended.

Figure 7:
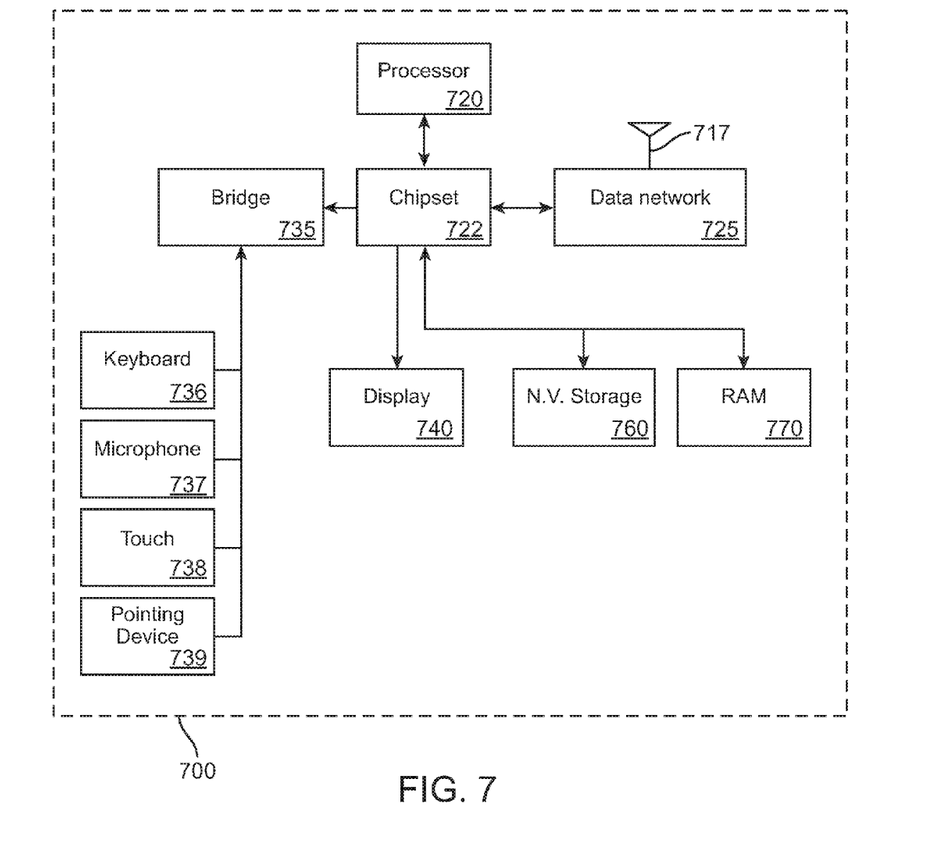
FIG. 7 is a schematic illustration of an exemplary system embodiment.

FIG. 7 illustrates a computer system 700 used in executing the described method. Computer system 700 is an example of computer hardware, software, and firmware that can be used to implement disclosures above. System 700 includes a processor 720, representative of any number of physically and/or logically distinct resources capable of executing software, firmware, and hardware configured to perform identified computations. Processor 720 communicates with a chipset 722 that can control input to and output from processor 720. In this example, chipset 722 outputs information to display 740 and can read and write information to non-volatile storage 760, which can include magnetic media and solid-state media, for example. Chipset 722 also can read data from and write data to RAM 770. A bridge 735 for interfacing with a variety of user interface components can be provided for interfacing with chipset 722. Such user interface components can include a keyboard 736, a microphone 737, touch detection and processing circuitry 738, a pointing device, such as a mouse 739, and so on. In general, inputs to system 700 can come from any of a variety of sources, machine-generated and/or human-generated.

Chipset 722 also can interface with one or more data network interfaces 725 that can have different physical interfaces 717. Such data network interfaces can include interfaces for wired and wireless local area networks, for broadband wireless networks, as well as personal area networks. Some applications of the methods for collecting data in the location-popularity index and ranking and returning location search results disclosed herein can include receiving data over physical interface 717 or be generated by the machine itself by processor 720 analyzing data stored in memory 760 or 770. Further, the machine can receive inputs from a user via devices 736, 737, 738, 739 and execute appropriate functions, such as browsing functions, by interpreting these inputs using processor 720.

Methods according to the above-described examples can be implemented using computer-executable instructions that are stored or otherwise available from computer-readable media. Such instructions comprise, for example, instructions and data which cause or otherwise configure a general purpose computer, special purpose computer, or special-purpose processing device to perform a certain function or group of functions. Portions of computer resources used can be accessible over a network. The computer executable instructions may be, for example, binaries, intermediate-format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware, and/or software, and can take any of a variety of form factors. Typical examples of such form factors include laptops, smart phones, small form factor personal computers, personal digital assistants, and so on. Functionality described herein also can be embodied in peripherals or add-in cards. Such functionality also can be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further, and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
assigning, by a server computer, a unique ID to each of a plurality of handheld communication devices, wherein the unique IDs are used to anonymously report location coordinates;
transmitting, by the server computer, each respective unique ID to the handheld communication device assigned to each respective unique ID, wherein each of said plurality of handheld communication devices stores a received unique ID;
receiving global positioning system (GPS) location coordinates reported from each of said plurality of handheld communication devices, wherein the GPS location coordinates reported from each of said plurality of handheld communication devices are associated with each received unique ID;
mapping each of the GPS location coordinates to map objects, wherein the map objects are identified by map data describing their perimeters;
determining whether a map object represents a location that will be searched upon by category;
determining if a user associated with one of the handheld devices remained within the location for longer than a duration determined to indicate that the user visited the location;
recording the visit of longer than the determined period of time by the user as visitor-location data; and
aggregating the visitor-location data collected from the plurality of handheld devices.

2. The method of claim 1, further comprising ranking search results based upon the aggregated visitor-location data.

3. The method of claim 1, wherein the aggregated visitor-location data is stored in a location-popularity index.

4. The method of claim 3, wherein the location-popularity index includes categories of data, the data associated with the categories being used to rank the search results.

5. The method of claim 4, wherein the categories are one or more of duration of stay, time of day during visit, previous location of user before the visit, distance traveled to visit, and whether the user searched for the location before visiting.

6. The method of claim 5, wherein the location-popularity index includes values assigned to each location for each category described in the location-popularity index.

7. The method of claim 6, wherein the assigned value is a weighed value used in ranking search results for one or more locations described in the location-popularity index.

8. A product comprising:
a non-transitory machine-readable medium; and
machine-executable instructions fixed on said medium for causing a computer to perform the method comprising:
receiving position data associated with a plurality of handheld communication devices have been assigned unique IDs to anonymously report position data;
mapping each of the received position data to map objects, wherein the map objects are associated with map data describing their perimeters;
determining whether a map object represents a location that will be searched upon by category;
recording a visit if one of the handheld devices remained within the perimeter of a location for greater than a predetermined duration;
aggregating position data describing the locations when a visit is recorded;
storing the aggregated position data in a location-popularity index;
processing a search request for a class of locations to identify search results; and
ranking the search results based upon values recorded in the location-popularity index derived from data reported from a plurality of handheld communication devices.

9. The product of claim 8, wherein the location-popularity index comprises data derived from aggregated data from a plurality of users' position data that is reported by the handheld communication devices carried by each of the users, and correlated to locations.

10. The product of claim 9, wherein the location-popularity index includes data describing categories, the data associated with the categories being used to rank the search results.

11. The product of claim 10, wherein the categories are selected from the group consisting of: period of time of stay, time of day during visit, previous location of user before the visit, distance traveled to visit, and whether the user searched for the location before visiting.

12. The product of claim 11, wherein the location-popularity index includes values assigned to each location for each category described in the location-popularity index.

13. The product of claim 12, wherein the assigned value is a weighted value used in ranking search results for one or more locations described in the location-popularity index.

14. A system, comprising:
a plurality of handheld communication devices, each device having a unique ID assigned and stored on each handheld communication device, wherein each unique ID is used to anonymously report position data representing a position one of the plurality of mobile communication devices as determined by global positioning system location coordinates without identifying said user;
a first server configured to:
receive position data reported from each of said plurality of handheld communication devices,
map received position data to map objects, wherein the map objects are associated with map data describing their perimeters;
determine whether a map object represents a location searchable by category and disregard position data associated that is not mapped to map objects that represent a location searchable by category;
record a visit if one of the handheld devices remained within the perimeter of a location for greater than a predetermined duration, and
position data describing the locations when a visit is recorded and store the aggregated position data in a location-popularity index; and
a second server configured to rank search results returned responsive to a query for a location based on data stored in the location-popularity index.

15. The system of claim 14, wherein the location-popularity index includes data describing categories, based on assumptions derived from the aggregated visitor-location data.

16. The system of claim 15, wherein the location-popularity index includes a value assigned for each location described in the location-popularity index, the value representing a relative score for that location and used to rank the search results.

17. A computer-implemented method, comprising:
generating aggregated visitor-location data reported from a plurality of handheld communication devices,
   wherein each of the plurality of handheld communication devices have a unique ID assigned and stored on each handheld communication device,
   wherein each unique ID is used to report position data representing a position of one of the plurality of mobile communication devices as determined by global positioning system location coordinates without identifying any user of the plurality of handheld communication devices, and
   wherein the aggregated visitor-location data is generated for locations that are searchable based on category;
processing a search request for a class of locations to identify potential search results; and
ranking the potential search results based upon the aggregated visitor-location data reported from the plurality of handheld communication devices.

18. The method of claim 17, wherein the search results are ranked based on assumptions derived from the visitor-location data, the assumptions being relevant to the ranking of the search results.

19. The method of claim 18, wherein the assumption is that users that visit a location for at least a determined period of time like the location.

20. The method of claim 18, wherein the assumption is that a user that is within an office building is at work.

21. The method of claim 18, wherein the assumption is that a user within a residential address is at home.

22. The method of claim 18, wherein the assumption is that a location that is not known to be crowded will provide faster service than a location that is known to be crowded.

23. The method of claim 1, wherein the data describing global positioning system (GPS) location coordinates reported from each of said plurality of handheld communication devices does not include personally identifying data of any user of one of said plurality of handheld communication devices.

24. The method of claim 1 further comprising:
disregarding the GPS location coordinates when the map object does not represents a location that will be searched upon by category.

25. The product of claim 8, wherein the product comprises two or more server computers.

26. The system of claim 14, wherein each of the plurality of handheld communication devices filter location data for relevance before transmitting the position data and unique ID to the first server.

* * * * *